Oct. 2, 1962 G. ALEXANDROVSKY 3,056,588
CONVEYOR SCREW APPARATUS
Original Filed March 12, 1957 2 Sheets-Sheet 2

Inventor
GEORGE ALEXANDROVSKY
By Furman Rinehart
Attorney

United States Patent Office 3,056,588
Patented Oct. 2, 1962

3,056,588
CONVEYOR SCREW APPARATUS
George Alexandrovsky, Yonkers, N.Y. (% Cerro de Pasco Corp., 300 Park Ave., New York 22, N.Y.)
Original application Mar. 12, 1957, Ser. No. 645,429, now Patent No. 2,917,815, dated Dec. 22, 1959. Divided and this application Mar. 23, 1959, Ser. No. 801,359
2 Claims. (Cl. 257—101)

My invention relates to conveying screws having helical hollow flights. Such screws are being used either in conveyors or other processing apparatus wherein the screw is mounted on a shaft rotating in a stationary trough or other container, or in tubular conveyors or processors wherein the screw is internally attached to or is integral with a rotating tube.

This application is a division of my copending application Serial No. 645,429 filed March 12, 1957 (now Patent No. 2,917,815).

Screws having hollow flights are widely used in conveying and other processing apparatus where heat transfer is involved i.e. in operations where the processed material is to be cooled, or heated, or dried, or calcined or the like, and where the heat exchange medium is to be completely isolated from the processed material.

Conveying screws of the type described above are manufactured by pressing of prefabricated specially shaped metallic sheets; and they may have a hollow space in the screw flights which is separated from the hollow space in the shaft of the conveyor screw; as a result of which the heat exchange medium must flow through the conveyor in two separate currents and they are very expensive in manufacture and therefore their application is quite limited.

It is an object of my invention to provide a conveying screw having helical hollow flights which avoid the disadvantages of the known screws, which is cheap in manufacture and which is particularly suited for use in tubular conveyor of the type referred to above.

The difference between the principle of my invention and that of known conveyor screws is that the two hollow separated spaces, in the flights and shaft of existing conveyor screws, require two currents of heat medium whereas in my construction the space between the flights and hollow shaft communicate with each other to form a single uninterrupted space, so that heat exchange fluid may flow as a single current through the conveyor screw.

The said and other objects of my invention will be more fully understood from the following specification when read with the accompanying drawings.

Figure 2:
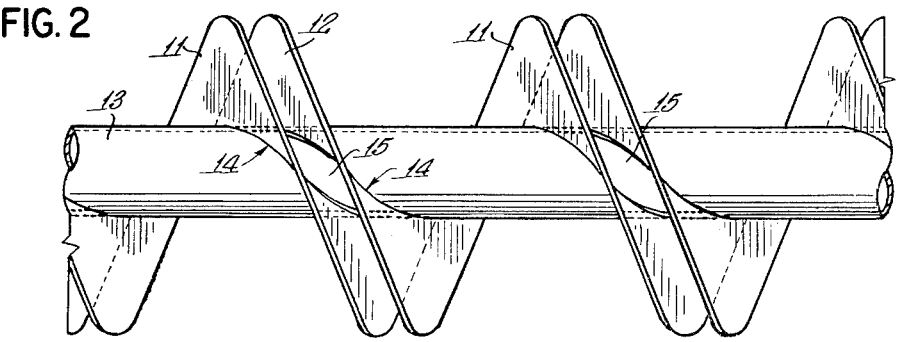
FIGS. 2 and 3 show in front view two succeeding stages of said screw during its manufacture.
Figure 3:
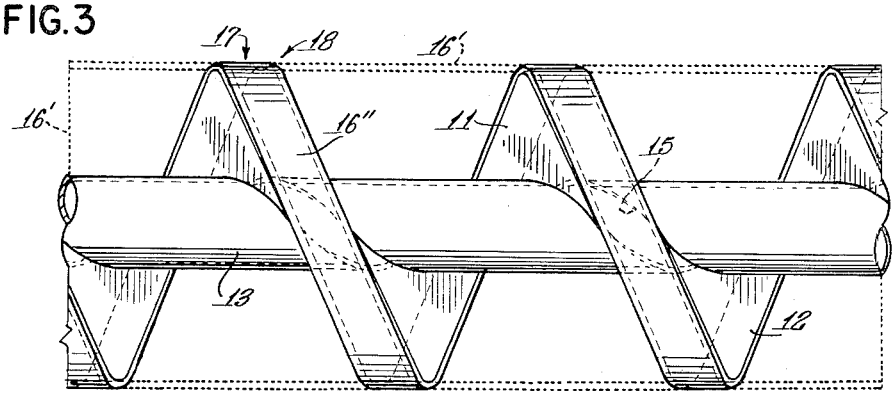
Figure 1:
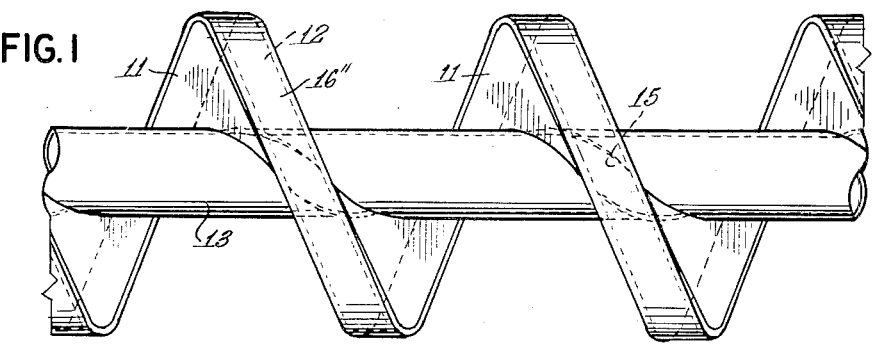
FIG. 1 is a front view of a conveying screw according to my invention.

The conveyor screw shown in FIG. 1 is manufactured in the following manner:

A pair of metallic helical spirals 11, 12 of standard manufacture are mounted in spaced relation upon a tubular shaft 13 and are thereupon welded or otherwise tightly attached thereto at their contacting edges 14 as shown in FIG. 2. It will be observed in FIG. 1 that the distance between the pair of spirals 11, 12 is less than half the length of the pitch of the spirals. Thereafter the portions 15 of the shaft 13 situated between said pair of spirals are cut out for example by an oxygen flame. During the second manufacturing stage, illustrated in FIG. 3 a tubular cover 16 is placed over the assembly shown in FIG. 2, its portions 16' (shown in dotted lines) situated between the flights 12—11 are cut out leaving a spiral strip 16" and the contacting edges 17, 18 are connected by welding or the like, thus finishing the conveyor screw shown in FIG. 1. It will be understood that in said manufacturing operation the outer tube may be cut into the spiral shape 16" shown in FIG. 3 before placing the same over the assembly shown in FIG. 2, or that a sheet strip of spiral shape conforming to the cut out spiral 16" may be used, and that also, if desired, the spiral section 15 may be cut out from the tubular shaft 13 prior to attaching the helical spirals 11, 12 thereupon.

In the embodiment shown in FIG. 1 the liquid or gaseous heat exchange medium is introduced into the tubular shaft 13 and flows through the same and the hollow screw flights formed between the spirals 11, 12 thus effectively heating or cooling or drying the material to be processed.

Figure 5:
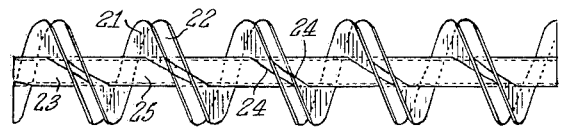
FIGS. 5 to 7 show in front view three succeeding stages of said screw during its manufacture.
Figure 6:
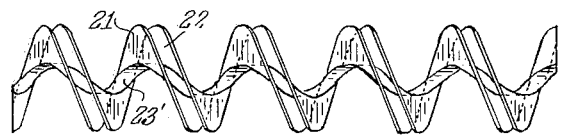
Figure 7:
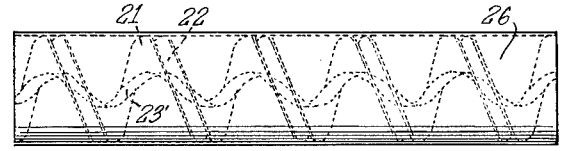
Figure 4:
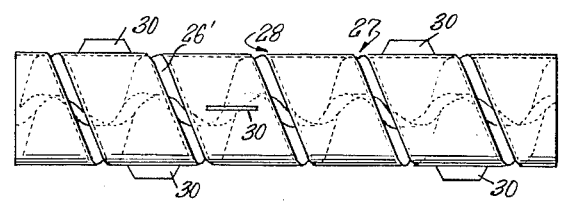
FIG. 4 shows a front view of another embodiment of my new conveying screw for use in a rotary tubular conveyor.
Figure 8:
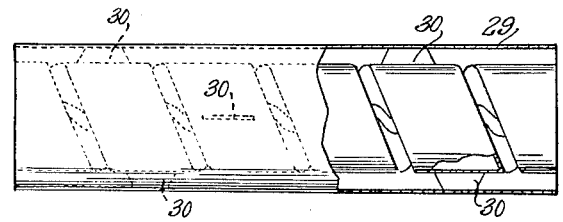
FIG. 8 shows in front view the finished tubular conveyor (the outer tube being partially broken off)
Figure 9:
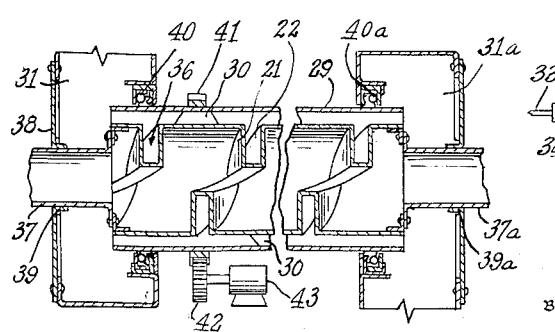
FIGS. 9 and 10 show in longitudinal sections the tubular conveyor attached, respectively, to two different means for supplying the heat exchange medium.
Figure 10:
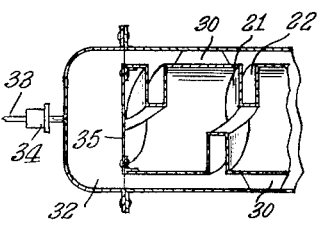

Instead of closing the screw flights of the coordinated spirals 11, 12 at their outer diameter by the strip 16" as shown in FIG. 1 the screw flights of coordinated spirals may be closed at their inner diameter as shown in FIG. 4 and in this form used in a rotary tubular conveyor of the type illustrated in FIGS. 8, 9 and 10. Such tubular conveyors are manufactured as follows:

A pair of metallic helical spirals 21, 22 of standard manufacture are mounted in spaced relation upon a tubular member 23 and are thereupon welded or otherwise tightly attached thereto at their contacting edges 24 as shown in FIG. 5. Thereafter the portions 25 of the shaft situated between the spirals 22—21 are cut out leaving a helical strip 23' connecting the said spirals at their inner diameter (FIG. 6). It will be observed in FIG. 5 that the length of portion 25 is more than half the length of the pitch of the spirals 21, 22. Thereupon a tubular body, 26 is placed over the assembly shown in FIG. 6, its portions 26' between the spirals 21—22 are cut out as illustrated in FIG. 4 and the contacting edges 27, 28 are tightly connected by welding or the like thus shaping a hollow spiral closed at its inner diameter and open at its outer diameter. It will be well understood that in said manufacturing operation the outer tube 26 and/or the tubular member 23 may be either cut into the required spiral shape before attaching the same to the spirals 21, 22, or may be replaced by a sheet strip of spiral shape.

The assembly shown in FIG. 4 is then placed centrally into the rotary conveyor tube 29 and firmly attached thereto by distancing means such as metal plates 30 or the like. The ends of the conveyor tube 29 may be either, as shown in FIG. 9, rotatably and tightly mounted in a front container 31, and a rear container 31a, the heat exchange medium being supplied from one and emptied into the other container after having flown between the conveyor tube 29 and the conveying screw as well as through the hollow helical channels 36 thereof. Alternatively as shown in FIG. 10 the tube 29 may be closed at each end by a cover cap 32 and the heat exchange medium introduced by an inlet pipe 33 through a union connection 34 and let out at the other end of the conveyor tube (which is not shown) by a corresponding outlet pipe. In FIG. 10 the inner space of the conveyor screw is closed at each end against the flow of the heat exchange medium by tightly mounted cover plates 35. For introducing feed into the conveyor more particularly into the inner space of the conveyor screw thereof a conventional feeder is attached at or near to its forward end. Such a conventional feeder arrangement is shown in FIG. 9. A conduit 37, extending through the wall 38 of container 31 is rotatable in a bearing 39 and the tube 29 is rotatable in bearing 40. This feed conduit 37 leads into the interior of the hollow screw. The inner end of the conduit 37 is secured to the end of the hollow screw in conventional manner so that the screw and the feed conduit rotate together. The rear end container 31a is of similar conventional construction as the front end container 31 so that material fed through conduit 37 passes through the hollow screw and is discharged through conduit 37a which rotates in a bearing 39a; the tube 29 rotating in bearing 40a. The heat exchange medium is introduced through container 31 and is exhausted through rear container 31a after passing through the tube 29. Conventional means for rotating the tubular conveyor may be employed; such as ring gear 41, secured to the periphery of tube 29, meshing with pinion 42, which in turn is driven by a motor 43.

While specific embodiments of my invention have been shown and described in detail to illustrate the application of the principles of my invention, it will be well understood that the same may be otherwise executed and embodied without departing from such principles.

What is claimed is:

1. In a rotatable tubular screw conveyor apparatus, an outer rotatable cylindrical conveyor tube, a hollow conveyor screw through which hot solids may be conveyed, said hollow screw being fixedly mounted coaxially and concentrically within said outer tube and rotatable in unison with said outer tube, feed means to supply hot solids to the interior of said hollow screw at its front end and discharge means to discharge hot solids from the rear end, said conveyor screw comprising a first coaxial helical strip and a second coaxial helical strip arranged in parallel relation providing a pair of coaxial helical strips equidistant apart through their lengths, said pair of helical strips being substantially transverse of the axis of rotation of said screw and having helically shaped inner edges and helically shaped outer edges, an inner tubular helical strip having oppositely disposed helical shaped edges, one edge of said inner tubular helical strip being tightly connected with the inner helical edge of said first helical strip and the other of said helical edges of said inner tubular helical strip being tightly connected with the inner helical edge of said second helical strip, an outer tubular helical strip having oppositely disposed helically shaped edges, one of said edges of said outer tubular helical strip being tightly connected to the outer helical edge of said first helical strip and the other of said edges of said outer tubular helical strip being tightly connected to the outer helical edge of said second helical strip, said inner tubular helical strip lying in the helical area inside the inner edges of said pair of first and second helical strips, said inner tubular helical strip together with said pair of first and second helical strips defining a helical channel communicating with the interior of said tube along the entire length of said hollow screw, said outer tubular helical strip lying in the helical area outside the outer edges of said pair of first and second helical strips, a plurality of longitudinally and circumferentially spaced spacer-elements secured to the interior surface of said outer tube and to the outer surface of said outer tubular helical strip of said hollow conveyor screw and fixedly mounting said screw within said outer tube in a position which provides an annular space of substantial radial length between the inner surface of said outer tube and the outer surface of said outer tubular helical strip along the entire length of said tubular helical outer strip, said helical channel communicating along the entire length of said screw with said annular space, said helical channel and communicating annular space providing passageway for fluid heat-exchange medium through which the said fluid medium may pass in a single undivided stream from one end of said tube to the other to effect contact of the liquid heat-exchange medium with the total area of said helical channel and the total area of said outer tubular helical strip as the heat-exchange medium passes through said tube, means positioned at each end of said conveyor tube having supporting means for rotatably and tightly mounting said tube at both of its ends; means for introducing heat exchange medium into said annular space in said tube, means for discharging said heat exchange medium after it has passed through said annular space, and means for rotating said tube together with said hollow screw.

2. A rotatable tubular screw conveyor apparatus constructed according to claim 1 in which the outer tubular helical strip has a coaxial width more than half the pitch of said pair of first and second helical strips and the inner tubular helical strip defines the width of said helical channel and has a coaxial width less than half the pitch of said pair of first and second helical strips.

References Cited in the file of this patent

UNITED STATES PATENTS

| 327,205 | Thorp | Sept. 29, 1885 |
| 614,130 | Patts | Nov. 15, 1898 |
| 1,303,470 | Gillette | May 13, 1919 |
| 2,105,782 | Fauth | Jan. 18, 1938 |
| 2,761,652 | Broman | Sept. 4, 1956 |
| 2,761,657 | Rietz | Sept. 4, 1956 |
| 2,875,985 | Hold | Mar. 3, 1959 |

FOREIGN PATENTS

| 534,988 | Germany | Oct. 5, 1931 |